United States Patent [19]

Kanekura

[11] Patent Number: 5,561,804
[45] Date of Patent: Oct. 1, 1996

[54] OPERATION PROCESSING APPARATUS FOR EXECUTING A FEEDBACK LOOP PROCESS

[75] Inventor: Hiroshi Kanekura, Yamatokoriyama, Japan

[73] Assignee: Sharp Kabushiki Kaisha, Osaka-fu, Japan

[21] Appl. No.: 21,963

[22] Filed: Feb. 24, 1993

[30] Foreign Application Priority Data

Feb. 24, 1992 [JP] Japan .................................. 4-036314

[51] Int. Cl.⁶ ................................................ G06F 13/00
[52] U.S. Cl. .......................... 395/800; 364/754; 364/759; 364/DIG. 1; 364/231.8; 364/229.3; 364/269; 395/775
[58] Field of Search ................................ 364/165, 262, 364/754, 759, 231.8, 229.3, 269; 395/800, 775

[56] References Cited

U.S. PATENT DOCUMENTS

| | | | |
|---|---|---|---|
| 4,907,187 | 3/1990 | Terada et al. ........................ | 395/375 |
| 4,918,644 | 4/1990 | Terada et al. ........................ | 395/325 |
| 4,943,916 | 7/1990 | Asano et al. ......................... | 395/775 |
| 5,157,214 | 10/1992 | Nakanishi et al. ................... | 84/622 |
| 5,299,144 | 3/1994 | Bartkowiak et al. ................ | 364/715.01 |
| 5,321,387 | 6/1994 | Terada et al. ........................ | 340/146.23 |
| 5,343,501 | 8/1994 | Kadono et al. ....................... | 375/94 |

OTHER PUBLICATIONS

μD77230 Data Sheet from *ADSP μPD77230* By NEC Corporation, 1986, pp. 4–5.

*Primary Examiner*—Mehmet B. Geckil
*Assistant Examiner*—Robert E. Stachler II

[57] ABSTRACT

An operation processing apparatus includes an operation executing unit having a first input connected to one end of a circular pipeline and a second input to which the operation result of a preceding feedback loop process is provided. The operation execution unit responds to an input of a data packet including a feedback loop process instruction for continuously executing multiplication and adding operations with respect to an operand included in the input data packet and an operand provided from the second input to provide the multiplication result to the other end of the circular pipeline. The operation processing apparatus further includes an operation result holding unit responsive to a supplied hold timing signal for holding an adding result of the operation execution unit for providing the same to the second input at the time of executing a subsequent feedback loop process, and a synchronization control unit for controlling synchronization of the operation execution of the operation executing unit and the operation of the operation result holding unit.

11 Claims, 9 Drawing Sheets

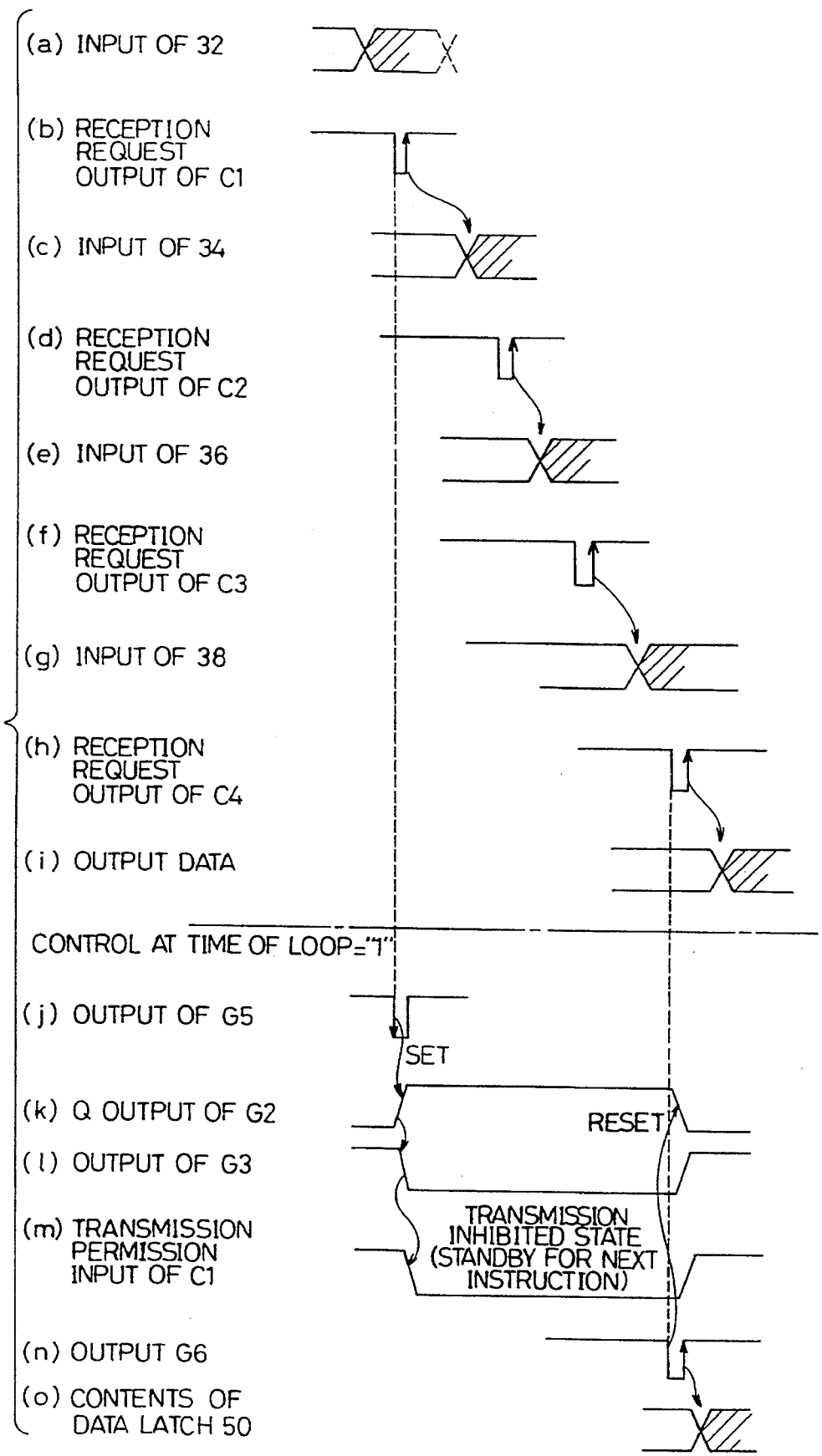

5,561,804

OPERATION PROCESSING APPARATUS FOR EXECUTING A FEEDBACK LOOP PROCESS

BACKGROUND OF THE INVENTION

1. Field of the Invention

The present invention relates to an operation processing apparatus used in data driven type processors and the like having a circular pipeline, and more particularly, to an operation processing apparatus for carrying out at high speed the process of a feedback loop included in a digital filter and the like.

2. Description of the Related Art

FIG. 1 is a signal flow graph of a 1-st order IIR (Infinite Impulse Response) filter as an example of a digital filter. The digital filter is a digital circuit including an adder element, a delay (generation increment) element, and a multiplier element. The digital filter shown in FIG. 1 includes adder elements 52 and 58, a delay element 54 for generation increment, and multiplier elements 56, 60 and 62.

FIG. 2 is a signal flow graph of the feedback loop functioning as a critical path in the flow graph of FIG. 1. Referring to FIG. 2, the feedback loop includes an adder element 52, a delay element 54, and a multiplier element 56. The operation result of one preceding generation having a factor of -B1 multiplied by multiplier element 56 is added to a fed data μ to be provided to a subsequent process as an output θ as well as to delay element 54. Delay element 54 holds the operation result and provides the operation result of one preceding generation to multiplier element 56.

When the digital filter of FIG. 1 is realized using a data driven type processor having a circular pipeline, the process is carried out as follows. Upon provision of both a fed data and a history value with respect to an input of one preceding generation from multiplier element 56, an addition instruction is executed. The added result output to the circular pipeline is provided to a subsequent process as the result of a feedback loop process, and also to the circular pipeline as an input for the next generation increment operation. In response, a generation increment operation is carried out. The result is output to the circular pipeline and then fed as an input of the next multiplication operation. When the result of a generation increment operation is fed, a multiplication process with the factor of -B1 is executed, whereby the result is output to the circular pipeline. This value becomes one of the input data for the addition operation in the next feedback loop execution via the circular pipeline.

According to this conventional art, the three operations shown in FIG. 2 (addition, generation increment, multiplication) are carried out by circulating subsequently the circular pipeline. It is therefore necessary to circulate the circular pipeline at least three times for one feedback loop operation. If the time required to circulate the circular pipeline once is 1μ seconds, the time required for one feedback loop operation is 3μ seconds. Data cannot be fed from the input portion during this time period, so that a digital filter process of high speed was not possible.

Such a data driven type processor is generally provided with a multiplication unit for carrying out multiplication process and an arithmetic logic operation unit for carrying out arithmetic logic operation.

FIG. 3 is a circuit block diagram of a multiplication unit used in the operation processing apparatus of a conventional data driven type processor. Referring to FIG. 3, the multiplication unit includes a decoder 40a, data latch circuits 32a, 34a, 36a, 38a, a multiplier 46a provided between data latch circuits 36a and 38a, and a data selector 48a connected to the output of data latch circuit 38a. The multiplication unit also includes transfer control elements C1–C4 for controlling the operation timing of each data latch circuit for properly carrying out a pipeline process.

The multiplication unit shown in FIG. 3 operates as follows. Right data and left data for a multiplication process and an instruction code indicating an instruction to be executed are provided to the multiplication unit. Decoder 40a decodes the instruction code to provide the same to data latch circuit 32a. The right data, the left data, and the decoded instruction code are subsequently transferred to data latch circuits 34a and 36a according to a reception request signal and a transmission permission signal transferred between one of transfer control elements C1–C3 and a preceding/succeeding transfer control element.

The right data provided from data latch circuit 36a is supplied to multiplier 46a. The left data provided from data latch circuit 36a is supplied to multiplier 46a and to data latch circuit 38a. Multiplier 46a multiplies the respective n bits of right data by the left data to provide the multiplied result of 2n bits to data latch circuit 38a. The instruction code is provided from data latch circuit 36a to data latch circuit 38a. Data latch circuit 38a responds to a clock signal from transfer control element C4 to hold the respective input data which are provided to data selector 48a.

Data selector 48a responds to a decoded instruction code provided from data latch circuit 38a to select either the left data provided from data latch circuit 38a or the multiplication result of multiplier 46a to provide the same as data of 2n bits to a subsequent shift circuit and a tag processor not shown.

In an operation processing apparatus of a conventional data driven type processor, only one operation was executable during one circulation of the circular pipeline. Data must circulate the circular pipeline several times in order to execute the above-described feedback loop. Data cannot be fed from an input unit during this time period, impracticable of high speed operation process of the feedback loop.

SUMMARY OF THE INVENTION

From the foregoing, an object of the present invention is to provide an operation processing apparatus that can carry out an operation process including a feedback loop process at a high speed.

Another object of the present invention is to provide an operation processing apparatus that can have the operation process including a feedback loop process with respect to a data packet reduced in the number of times the data packet circulates the circular pipeline to the number of operations included in that feedback loop process.

A further object of the present invention is to provide an operation processing apparatus that can complete an operation process including a feedback loop process with respect to a data packet during one circulation of the data packet in the circular pipeline.

Still another object of the present invention is to provide an operation processing apparatus that can have an operation process including a continuous feedback loop process completed during one circulation of the data packet in the circular pipeline per each feedback loop process, and that can have the adverse effect to the calculation result due to high speed eliminated.

An operation processing apparatus according to the present invention is used in a data driven type processor having a circular pipeline, wherein a feedback loop process including specific plurality of operations is repeatedly executed with respect to a data packet circulating the circular pipeline. This operation processing apparatus includes an operation executing unit having a first input connected to one end of the circular pipeline and a second input to which the operation result of a preceding feedback loop process is supplied. The operation executing unit responds to an input of a data packet including a specific instruction for executing a plurality of operations to an operand included in an input data packet and an operand provided from the second input to provide the result or an intermediate result to the other end of the circular pipeline. The operation processing apparatus further includes an operation result holding unit responsive to a supplied hold timing signal for holding an operation result of the operation executing unit and providing the same to the second input at the time of executing a succeeding feedback loop process, and a synchronization control unit for controlling synchronization of an execution of operation by the operation executing unit and the operation of the operation result holding unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 schematically shows a field structure of a data packet processed in a data driven type processor and the like.

FIG. 10 is a timing chart showing the operation of the multiplication unit shown in FIG. 9.

DESCRIPTION OF THE PREFERRED EMBODIMENTS

The present invention allows a high speed process of a feedback loop by improving a multiplier included in an operation processing apparatus such as a data driven type processor.

Figure 4:
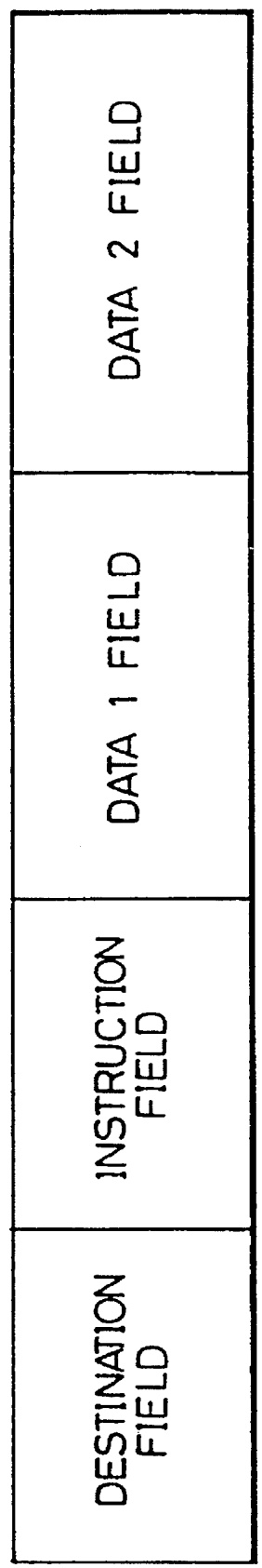

Referring to FIG. 4, a data packet processed by the data driven type processor of the present embodiment includes a destination field, an instruction field, a data 1 field, and a data 2 field. The destination information of a data packet is stored in the destination field. Instruction information is stored in the instruction field. Operands are stored in the data 1 field or the data 2 field. The destination field and the instruction field constitute what is called a tag.

Figure 5:
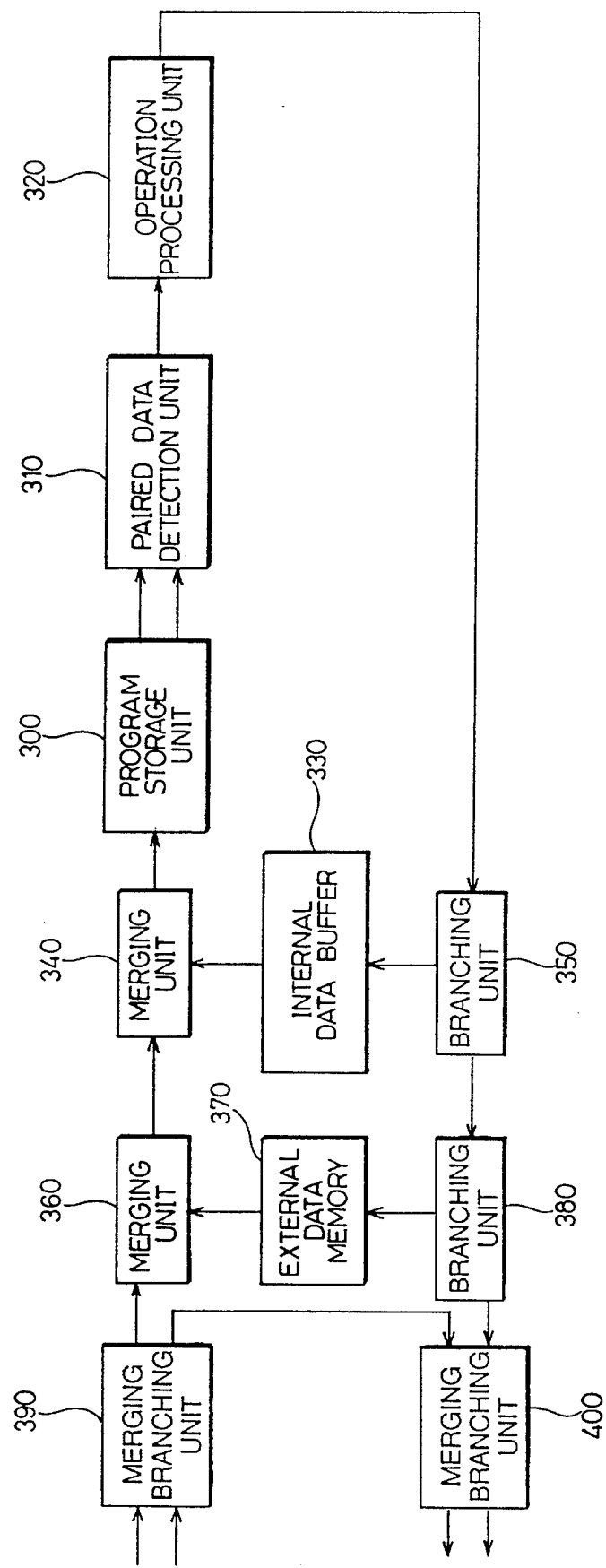
FIG. 5 is a block diagram showing an example of a structure of a data driven type processor.

Referring to FIG. 5, a data driven type processor using the operation processing apparatus of the present embodiment includes merging/branching units 390 and 400, merging units 340 and 360, branching units 350 and 380, an external data memory 370, an internal data buffer 330, a program storage unit 300, a paired data detection unit 310, and an operation processing unit 320.

Figure 6:
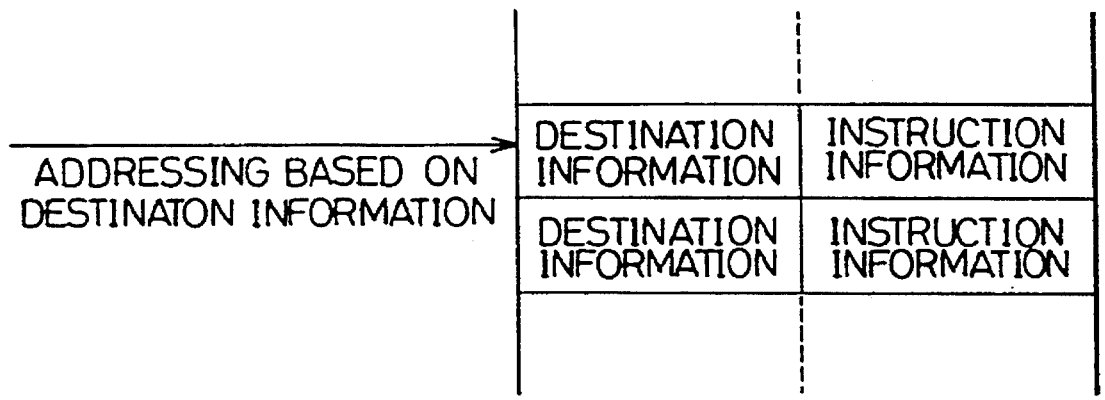
FIG. 6 schematically shows a data flow program stored in a program storage unit.

A program storage unit 300 shown in FIG. 5 stores a data flow program shown in FIG. 6. Each line in the data flow program includes destination information and instruction information. Program storage unit 300 responds to addressing according to the destination information of the input data packet to read out designation information and instruction information from the data flow program, as shown in FIG. 6, to store that destination information and command information in the destination field and the instruction field, respectively, of a data packet. Then, that data packet is output.

Referring to FIG. 5, a paired data detection unit 310 carries out matching of a data packet provided from program storage unit 300. When the instruction information indicates a 2-input instruction, paired data detection unit 310 detects the matching of two different data packets having the same destination information when provided. Then, the operand data (the content of the data 1 field shown in FIG. 4) of one of the data packets is stored in the data 2 field of the other data packet. That other data packet is then output. When the instruction information indicates a 1-input instruction, paired data detection unit 310 directly outputs the input data packet.

Operation processing unit 320 carries out an operation process according to the instruction information to the data packet provided from paired data detection unit 310. The result is stored in the data 1 field of the data packet, whereby the data packet is provided to a branching unit 350.

Branching unit 350 provides the input data packet to a merging unit 340 via an internal data buffer 330 or to a branching unit 380. Merging unit 340 provides the data packet from internal data buffer 330 or from merging unit 360 to a program storage unit 300 in a first-in first-out manner.

An operation process according to the data flow program stored in program storage unit 300 proceeds by a data packet circulating a circular pipeline formed of program storage unit 300, paired data detection unit 310, operation processing unit 320, branching unit 350, internal data buffer 330, and merging unit 340.

Merging/branching units 390 and 400 serves to carry out communication between the data driven type processor and an external device. Branching unit 380 provides the data packet from branching unit 350 to merging/branching unit 400 or to external data memory 370. Merging unit 360 provides the input data packet from merging/branching unit 390 and the data packet from external data memory 370 to merging unit 340 in a first-in first-out manner.

Figure 7:
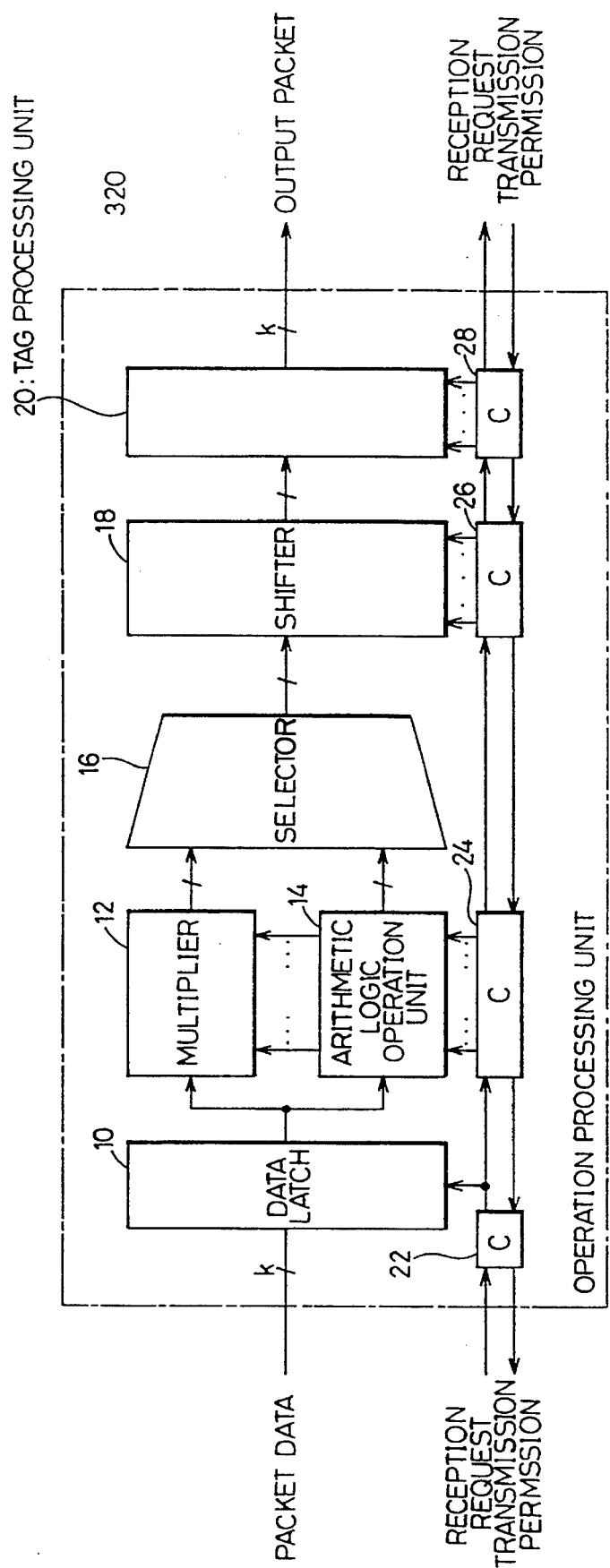
FIG. 7 is a block diagram of an operation processing unit.

FIG. 7 is a block diagram of the operation processing unit 320 of FIG. 5. Referring to FIG. 7, operation processing unit 320 includes a data latch circuit 10 for holding packet data of k bits provided from paired data detection unit 310 of FIG. 5, a multiplication unit 12 and an arithmetic logic operation unit 14 each having its input connected to the output of data latch circuit 10, a selector 16 having its inputs connected to the outputs of multiplication unit 12 and arithmetic logic operation unit 14, a shifter 18 having its input connected to an output of selector 16, and a tag processing unit 20 having its input connected to an output of shifter 18. A plurality of data latch circuits are provided in multiplier 12, arithmetic logic operation unit 14, shifter 18, tag processing unit 20 and the like to form a pipeline. Each data latch circuit has its synchronization controlled by transfer control element 22 and transfer control circuits 24, 26 and 28 to properly execute a pipeline process. Multiplier 12 and arithmetic logic operation unit 14 both have the same number of data latch stages, and are controlled by a common transfer control circuit 24.

Figure 8:
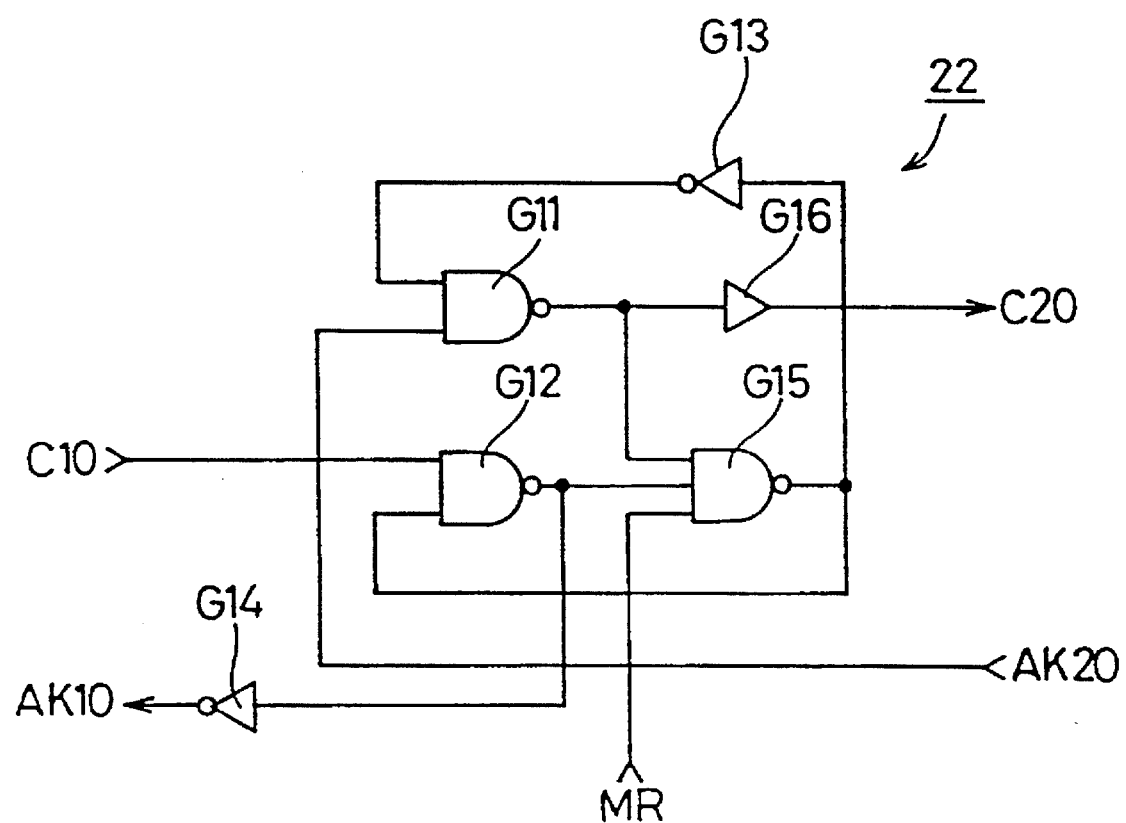
FIG. 8 is a circuit block diagram of a transfer control element.

Referring to FIG. 8, a transfer control element 22, for example, includes NAND gates G11, G12, and G15, inverters G13 and G14, and a buffer G16.

Figure 9:
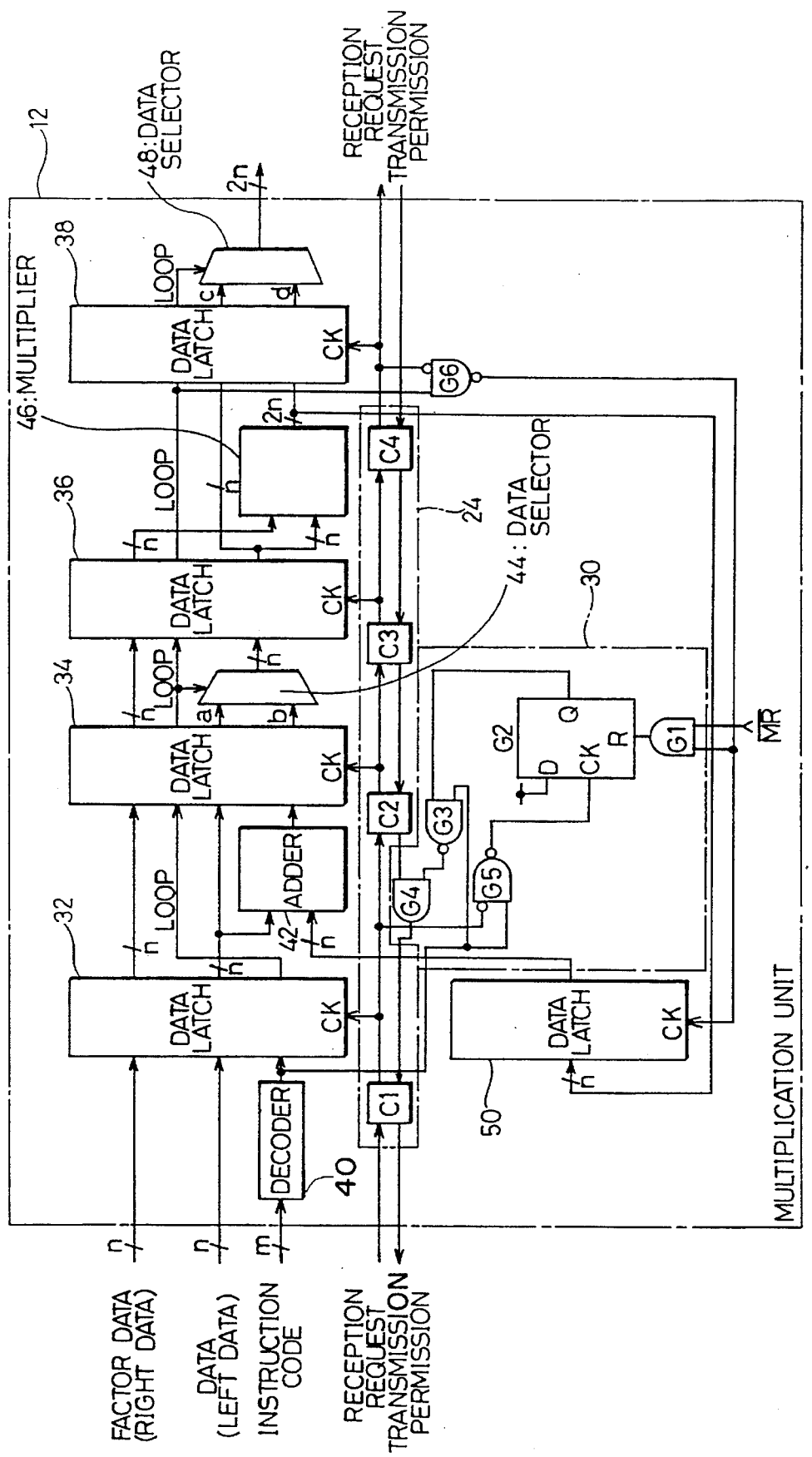
FIG. 9 is a block diagram of a multiplication unit of a operation processing apparatus according to the present invention.

FIG. 9 is a block diagram of an improved multiplication unit 12 according to the present invention. A transfer control circuit 24 is also illustrated to be described in FIG. 9.

Referring to FIG. 9, multiplication unit 12 includes a decoder 40, data latch circuits 32, 34, 36, and 38, a data selector 44, an adder 42 for carrying out an adding process in the feedback loop process of a digital filter, a data selector 48, a multiplier 46 for carrying out a multiplication process of a feedback loop process and the normal multiplication process, a synchronization control unit 30, and an accumulator unit formed of a data latch circuit 50 and the gate circuit G6 for holding a history value for a preceding generation input of the feedback loop process.

Synchronization control unit 30 includes gate circuits G1–G5. Gate G2 is formed of a D flipflop.

Transfer control circuit 24 includes transfer control elements C1–C4. Each transfer control element has a structure similar to that of transfer control element 22 shown in FIG. 7.

The multiplication unit 12 shown in FIG. 9 is characterized by including an instruction system that can operate a process of a feedback loop by 1 instruction, and the mechanism to execute a plurality of operation processes included in the feedback loop during one circulation of the circular pipeline. More specifically, multiplication unit 12 has the history value of a preceding generation input stored in an internal accumulator unit. According to the input data and the multiply factor of the supplied input packet, the history value of a preceding generation input is added to the input data to be output, and the result is multiplied by the factor provided in the packet identical to the input data. This multiplied result is stored as the update data in the accumulator unit as the history value for the next feedback loop operation. Thus, the operation processes included in the feedback loop can be carried out during one circulation of the circular pipeline.

The details of the execution mechanism is as follows. The execution mechanism is roughly divided into a synchronization control unit, an accumulator unit, a history adding unit, and a factor multiplication unit.

The synchronization control unit corresponds to synchronization control unit 30 of FIG. 9. When a feedback loop execution instruction is input during execution of an instruction for a feedback loop execution, synchronization control unit 30 functions to set the execution of that instruction in a standby state until the history value in the accumulator unit is updated.

The accumulator unit includes data latch circuit 50 and gate circuit G6. The accumulator unit stores the history value of a preceding generation and functions to provide a history value for the next feedback loop execution instruction.

The history adding unit corresponds to adder 42. Adder 42 carries out an adding process of an externally applied data and the history data stored in the accumulator unit. The operation result of adder 42 is output from multiplication unit 12 via data latch circuit 34, data selector 44, data latch circuits 36 and 38, and data selector 48 to be provided to a factor multiplication unit of multiplier 46.

As mentioned above, the factor multiplication unit includes a multiplier 46. Multiplier 46 multiplies the added result of adder 42 by a multiplication factor provided with the input data. As a result, the contents stored in data latch circuit 50 is updated. The output of multiplier 46 triggers permission of synchronization control unit 30 to a subsequent feedback loop process.

Multiplier 12 of FIG. 9 is implemented to carry out multiplication of 2 n-bit data by changing the data flow with data selector 44 to be commonly utilized as a circuit for a multiplication processing mechanism other than the feedback loop process.

Referring to FIGS. 7–9, an operation of operation processing unit 320 according to the present invention will be described.

First the operation of transfer control element 22 of FIG. 7 will be described schematically with reference to FIG. 8. The operation of the other transfer control elements is also similar.

The operation when the data latch circuit of the next stage is empty will be described.

When the data latch circuit of the next stage is empty, a transmission permission signal AK20 of 1 (logic 1) is provided from the transfer control circuit of the succeeding stage. When the reception request signal C10 provided from the preceding stage is brought to 0 (logic 0), NAND gate G12 provides an output of 1. As a result, the transmission permission signal AK10 provided from inverter G14 becomes 0 (inhibited state). Meanwhile, NAND gate G15 provides an output of 0 and inverter G13 provides an output of 1. Because transmission permission signal AK20 is 1, the output of NAND gate G11 is brought to 0. As a result, reception request signal C20 is pulled down to 0.

Data latch circuit 10 shown in FIG. 7 responds to the falling edge of reception request signal C20 to hold the input packet data and provides the same to multiplier 12 of the succeeding stage and to arithmetic logic operation unit 14.

The transfer control circuit of the succeeding stage receiving a reception request signal C20 pulls transmission permission signal AK20 to 0 in response to the fall of reception request signal C20.

In response to the output of NAND gate G11 pulled down to 0, NAND gate G15 provides an output of 1, and inverter G13 provides an output of 0. Therefore, the output of NAND gate G11 is pulled up again to 1. As a result, reception request signal C20 is pulled up to 1. Thus, reception request signal C20 is pulled to 1 after a predetermined time from the fall to 0.

Reception request signal C10 provided from a preceding unit is pulled up to 1 after a predetermined time. Therefore, NAND gate G12 provides an output of 0, and the output of inverter G14 is pulled up. As a result, transmission permission signal AK10 is pulled up to 1 again (permitted state).

As described above, when the transmission permission signal AK20 provided from a transfer control circuit of a succeeding stage is 1 (permitted state), the transmission permission signal AK10 provided to a unit of a preceding stage becomes 0 (inhibited state) in response to the fall of reception request signal C10 provided from an unit of a preceding stage. After a predetermined time period, the reception request signal C20 that will be provided to a transfer control circuit of a succeeding stage falls to 0.

The operation when the data latch circuit of a succeeding stage is occupied will be described hereinafter. In this case, the transmission permission signal AK20 provided from a transfer control circuit of a succeeding stage is 0 (inhibited state). When the reception request signal C10 provided from an unit of a preceding stage falls to 0, the output of NAND gate G12 becomes 1 and the output of inverter G14 falls to 0, causing transmission permission signal AK10 to be pulled to 0. When the transmission permission signal AK20 provided from a transfer control circuit of the succeeding stage is 0 (inhibited state), the output of NAND gate G11 is 1. Therefore, the reception request signal C20 provided to a transfer control circuit of a succeeding stage will maintain 1 as long as transmission permission signal AK20 is 0. Therefore, the input towards data latch circuit 10 of FIG. 7 is not transmitted to multiplier 12 and arithmetic logic operation unit 14.

When the transmission permission signal AK20 provided from a transfer control circuit of a succeeding stage becomes 1 (permitted state), the output of NAND gate G11 is pulled down to 0. In response, the reception request signal C20 provided to a transfer control circuit of a succeeding stage becomes 0, whereby the data latch circuit located at the first stage of multiplication unit 12 and arithmetic logic operation unit 14 maintains the output of data latch circuit 10 to provide the same to a succeeding circuit.

The transfer control element of the succeeding stage responds to the fall of reception request signal C20 provided from transfer control element 22 to pull down transmission permission signal AK20 to 0 (inhibited state) after a predetermined time. In response to the rise of transmission permission signal AK20 provided from the transfer control element of the succeeding stage, the transmission permission signal AK10 provided to the unit of the preceding stage is pulled up to 1 (permitted state) after a predetermined time.

Thus, the reception request signal C20 provided to the transfer control element of the succeeding stage will not fall to 0 when the transmission permission signal AK20 provided from the control element of the succeeding stage is 0 (inhibited state). In other words, data transfer is suppressed until transmission permission signal AK20 becomes 1 (permitted state) when the data transfer path of the succeeding stage is occupied.

Figure 1:
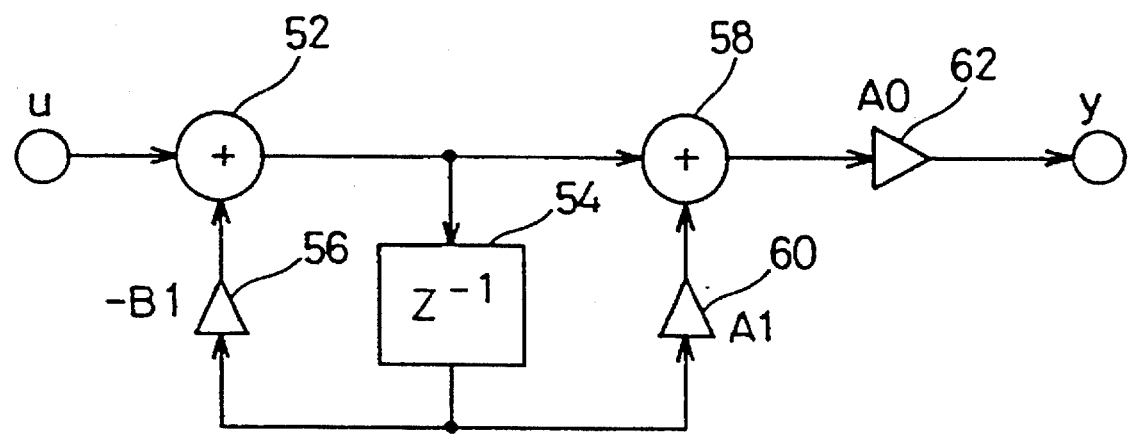
FIG. 1 is a signal flow graph of an example of a digital filter.
Figure 2:
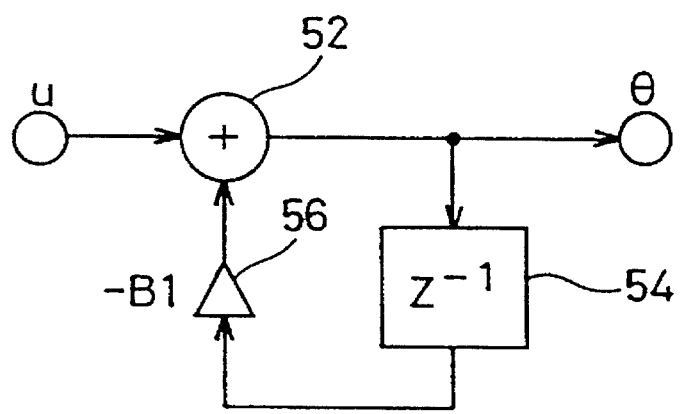
FIG. 2 shows a feedback loop which becomes a critical path in the signal flow graph of FIG. 1.
Figure 3:
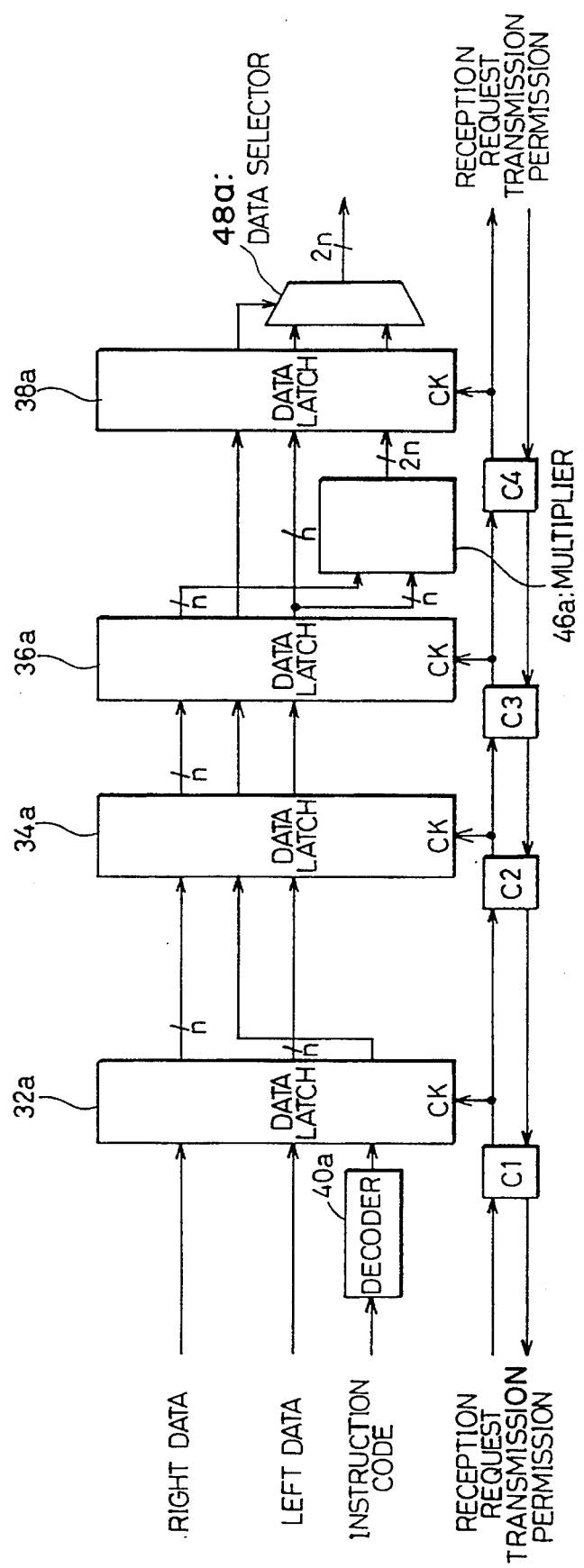
FIG. 3 is a circuit block diagram of a multiplication unit used in a conventional operation processing apparatus.

The data latch circuits included in multiplication unit 12, arithmetic logic operation unit 14, shifter 18 and tag processing unit 20 shown in FIG. 7 have its operation controlled by corresponding transfer control elements as described above to execute a pipeline process. The same can be said for each data latch circuit 32, 34, 36 and 38 shown in FIG. 1.

Referring to FIGS. 7 and 9, the details of an operation process by operation processing unit 320 will be described. In the following, description of the operation of each transfer control element will be omitted if not necessary.

A packet data of k bits is provided to data latch circuit 10 from paired data detection unit 310 shown in FIG. 5. Data latch circuit 10 provides this packet data to multiplication unit 12 and arithmetic logic operation unit 14. The details of arithmetic logic operation unit 14 will not be described since it is not related to this feedback loop process.

Referring to FIG. 9, a multiplication factor of n bits and data of n bits are provided as data to multiplication unit 12.

An instruction code of m bits is provided to decoder 40. Decoder 40 decodes the instruction code and produces a signal LOOP that becomes 1 only at the time of a feedback loop process instruction to provide the same to data latch circuit 32 as shown in FIG. 10(a).

Referring to FIG. 10(b), data latch circuit 32 latches the two n-bit data of the input data and a factor as well as signal LOOP at the timing when the reception request output of transfer control element C1 rises. Referring to FIG. 10(c), the input of data latch circuit 34 becomes the data latched in data latch circuit 32. The data latched in data latch circuit 32 (left data) and the operation result of a preceding generation held in data latch circuit 50 are provided to adder 42. Adder 42 adds the two values to provide the same to data latch circuit 34.

Referring to FIGS. 10(c) and (d), data latch circuit 34 latches the input at a timing defined by the rising edge of the reception request output from transfer control element C2. As a result, the data provided to data latch circuit 36 and the data provided to data selector 44 are the newly latched data in data latch circuit 34.

Data selector 44 selects the added result of adder 42 provided from data latch circuit 34 to a terminal b when signal LOOP is 1, and the input data provided to a terminal a via data latch circuits 32 and 34 when signal LOOP is 0. The selected value is provided to data latch circuit 36.

Referring to FIGS. 10(e) and (f), data latch circuit 36 latches the input data at a timing defined by the rising edge of the reception request output of transfer control element C3. Therefore, the input to the data latch circuit 38 and the input to multiplier 46 both take the newly latched value of data latch circuit 36.

A factor of n bits (right data) is provided to one input of multiplier 46. The added result of adder 42 or the data (left data) is provided to the other input when signal LOOP is 1 or 0, respectively. More specifically, when signal LOOP is 1, multiplier 46 multiplies the factor by the added result of adder 42 to provide the same to data latch circuit 38. When LOOP is 0, multiplier 46 multiplies the right data by the left data to provide the result to data latch circuit 38.

Referring to FIGS. 10(g) and (h), data latch circuit 38 latches data at a timing defined by the rising edge of the reception request output of transfer control element C4 to provide the latched data to data selector 48. This output is provided at a timing indicated by FIG. 10(i).

Therefore, the data provided to data selector 48 is as follows. When signal LOOP is 0, n-bit of data (left data) is directly supplied to one input c of data selector 48. The multiplied result of multiplier 46, i.e. the multiplication result of the left data by the right data is provided to the other input d. When signal LOOP is 0, data selector 48 selects the value of input d to provide the same as 2n bit data. This output is applied to a required shifting process by a subsequent shifter 18 to become n bits. The tag is replaced by tag processing unit 20 to be provided to the circular pipeline.

When LOOP is 1, the added result of adder 42 is provided to the one input c of data selector 48. More specifically, the added value of the input data of n bits and the operation result of a preceding generation latched in data latch circuit 50 is provided to input c. This value is also supplied to one input of multiplier 46. The multiplied result of multiplier 46 is supplied to the other input terminal d of data selector 48. More specifically, the multiplication result of a factor multiplied by the added result of adder 42 is supplied to input d. However in this case, data selector 48 responds to signal LOOP taking a value of 1 to select the input from input c to provide the same as data of n bits. More specifically, data selector 48 provides the added value of the data of n bits provided to multiplication unit 12 and the operation result of the feedback loop of one preceding generation. This output timing is as shown in FIG. 10(i).

Synchronization control unit 30 operates as follows. When the system is reset, gate G1 resets the D flipflop of gate G2, whereby the output Q becomes 0. As a result, the output of gate G3 becomes 1. Gate G4 directly provides to transfer control element C1 the transmission permission signal provided from transfer control element C2. Therefore, each of data latch circuits 32, 34, 36 and 38 respond to the transmission request output shown in FIGS. 10(b), (d), (f), and (h), respectively, by each of transfer control elements C1, C2, C3, and C4, respectively, to latch sequentially the input data, whereby the latched data is provided to the data latch circuit of a succeeding stage.

When a feedback loop processing instruction is input as an instruction code, synchronization control unit 30 operates as follows. Decoder 40 provides signal LOOP of 1. According to a reception request output from transfer control element C1 and signal LOOP of 1 from decoder 40 for latching the input data is latched by data latch circuit 32, gate G5 provides a pulse of level 0 generated only at the time of a loop process instruction as a clock signal to gate G2. This pulse is indicated in FIG. 10(j).

As shown in FIG. 10(k), in response to this pulse, the D flipflop of gate G2 is set and the Q output becomes 1.

As shown in FIG. 10(l), the output of gate G3 becomes 0 in response to the output of gate G2 pulled up to 1. As a result, gate G4 provides a 0 to the transmission permission input of transfer control element C1 regardless of the value of the transmission permission signal provided from transfer control element C2. Therefore, the transmission permission input to transfer control element C1 becomes 0 as shown in FIG. 10(m) to attain a transmission inhibited state. Therefore, when the signal provided to decoder 40 is a loop processing instruction, the latch of data latch circuit 32 is made to standby until the transmission permission to input transfer control element C1 becomes 1.

When an instruction other than a loop processing instruction is input, the output of decoder 40 becomes 0. As a result, the output of gate G3 becomes 1, and gate G4 directly provide to transfer control element C1 the transmission permission signal output from transfer control element C2. Therefore in this case, the latch of the data input to multiplication unit 12 for data latch circuit 32 is not deferred.

The standby state of a loop instruction is canceled as follows. Gate G6 generates a clock signal of data latch circuit 50 from the reception request output provided from transfer control element C4 and signal LOOP. When signal LOOP is 0, gate G6 always provides an output of 1. Therefore, data latch circuit 50 will not latch the output of multiplier 46. If signal LOOP is 1, gate G6 responds to a reception request signal provided from transfer control element C4 to generate a clock signal which is provided to data latch circuit 50. The generation timing of this clock signal is simultaneous to the data latch timing of data latch circuit 38. The output of gate G6 is indicated in FIG. 10(n). As shown in FIGS. 10(n) and (o), data latch circuit 50 latches the output of multiplier 46 at a timing defined by the rise of a clock signal provided from gate G6. The latched data is applied again to one input of adder 42.

When a clock signal is provided from gate G6, gate G2 is reset via gate G1. Therefore, the Q output of gate G2 returns to 0 again as shown in FIG. 10(k). In response, the output of gate circuit G3 becomes 1, as shown in FIG. 10(l), whereby gate circuit G4 will directly provide the transmission permission signal of transfer control element C2 to transfer control element C1. As a result, in response to the next instruction code, data latch by data latch circuit 32 is allowed, whereby execution of the next instruction is initiated.

Thus, in the multiplication unit of the operation processing apparatus according to the present embodiment, a feedback loop process can be executed by one process carried out by multiplication unit 12 by a certain instruction. It is not necessary to circulate data on the circular pipeline during the process to complete the feedback loop. That is to say, it is not necessary to provide an intermediate result during a process from operation unit 12 to the circular pipeline, and to continue a further feedback loop after the value is input again. The time required for data to circulate the circular pipeline is approximately 1μ seconds, for example. Therefore, approximately 3μ seconds will be required if one feedback loop process including three instructions are to be processed with a conventional operation processing apparatus. In contrast, the operation processing apparatus of the present invention responds to a certain instruction representing a feedback loop process to carry out the operation at one process without circulating the data on the circular pipeline. Therefore, the time required for a feedback loop process is reduced to less than ⅒, resulting in improving the performance of a data driven type processor. Particularly, when a digital filter having a feedback loop is to be realized, significant improvement in the operation speed of an operation processing apparatus can be achieved by the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An operation processing apparatus used in a data driven type processor having a circular pipeline for repeatedly executing a feedback loop process including specific plurality of operations, comprising first and second operations, to a data packet circulating said circular pipeline, said apparatus comprising:

operation executing means having a first input connected to one end of said circular pipeline for receiving a data packet input thereto and a second input to which an operation result of a preceding feedback loop process is supplied, responsive to the input of said data packet for executing said plurality of operations to a first operand included in said data packet and to an operand provided from said second input, and for outputting the result or an intermediate result of said plurality of operations to the other end of said circular pipeline, said operation executing means including:

instruction detection means having an input connected to said one end of said circular pipeline for detecting whether said data packet includes a feedback loop instruction, and providing an instruction detection signal based on the detection, first data holding means having inputs connected to said one end of said circular pipeline and said instruction detecting means for receiving said data packet, responsive to a first hold timing signal, for holding said instruction detection signal provided from said instruction detection means, said first operand and a second operand, first operation means having a first input connected to an output of said first data holding means and a second input connected to said second input of the operation executing means, for carrying out said first operation between said first operand provided from said first input and the operand provided from said second input of the operation executing means, second data holding means having a first input connected to receive the output of said first operation means and a second input connected to receive said second operand and said instruction detection signal from said first data holding means for holding the output of said first operating means, said second operand, and said instruction detection signal in response to a second hold timing signal, first selecting means including a first input connected to receive said first operand being processed in said operation executing means and a second input connected to receive the result or intermediate result of the operations, responsive to said instruction detection signal from said instruction detection means, for selectively outputting the first operand or the result or intermediate result of said plurality of operations, and second operation means having first and second inputs connected to receive said second operand and an output of said first operation means, respectively, from said second data holding means for carrying out said second operation between said second operand and the output of said first operation means;

operation result holding means having a first input connected to an output of said second operating means, an output connected to said second input of said first operation means, and a second input to which a fifth hold timing signal is supplied, responsive to said fifth hold timing signal for holding the operation result of said operation executing means and supplying the same to said second input of the operation executing means at the time of executing a succeeding feedback loop process; and synchronization control means for controlling the synchronization of the operation execution by said operation executing means and the operation with said operation result holding means according to the instruction detection signal generated from said instruction detection means, said synchronization control means providing said first, second and fifth hold timing signals.

2. The apparatus according to claim 1, wherein said first operation means comprises adder means.

3. The apparatus according to claim 2, wherein said second operation means comprises multiplier means.

4. The apparatus according to claim 1, wherein said second data holding means further holds said first operand, wherein said operation executing means further comprises third data holding means having a first input connected to receive said second operand from said second data holding means and a second input connected to the output of said first selecting means, responsive to a third hold timing signal provided from said synchronization control means for holding said second operand and the output of said first operation means and providing the same respectively to said first and second inputs of said second operation means, fourth data holding means having a first input connected to receive the output of said first selecting means from said third data holding means and a second input connected to the output of said second operation means, responsive to a fourth hold timing signal supplied from said synchronization control means for holding the output of said first selecting means and the output of said second operation means, and second selecting means having a first input connected to receive the output of said first selecting means from said fourth data holding means and a second input connected to receive the output of said second operation means from said fourth data holding means, responsive to said instruction detection signal for selectively providing to said circular pipeline the output of said first selecting means or the output of said second operation means.

5. The apparatus according to claim 4, wherein said synchronization control means comprises first to fourth timing control means for supplying said first to fourth hold timing signals to said first to fourth data holding means, respectively, said fourth timing control means providing said fourth hold timing signal to said fourth data holding means and a third transmission permission signal to said third timing control means in response to a data transmission permission signal from said circular pipeline, said first to third timing control means supplying said first to third hold timing signals to said first to third data holding means in response to first to third transmission permission signals from said second to fourth timing control means respectively, said first timing control means further supplying a fourth transmission permission signal to control means for controlling data transmission of said circular pipeline, said first data holding means holding and providing said instruction detection signal output from said instruction detection means in response to said first hold timing signal provided from said synchronization control means; and timing means having an input connected to receive said fourth holding timing signal from said fourth timing control means and said instruction detection signal from said third data holding means for supplying said fifth hold timing signal to said operation result holding means in response to said fourth hold timing signal from said fourth timing control means when said instruction detection signal is active.

6. The apparatus according to claim 1, wherein said synchronization control means further comprises executing initiation delay means responsive to the instruction detection signal provided from said instruction detection means and the output of said operation executing means for delaying initiation of execution of said feedback loop instruction by said operation executing means until said operation result holding means completes storage of the operation result from a preceding feedback loop process.

7. The apparatus according to claim 6, wherein said second and third data holding means hold and supply to said third and fourth data holding means, respectively, the instruction detection signal provided from said first and second data holding means in response to said second and third hold timing signals provided from said synchronization control means, said fourth data holding means supplies the instruction detection signal provided from said third data holding means to said execution initiation delay means, and said execution initiation delay means comprises means responsive to the instruction detection signal provided from said instruction detection means, a first transmission permission signal provided from a first timing control circuit, the instruction detection signal provided from said third data holding means, and a sixth hold timing signal provided from a second timing control circuit, for shifting and providing to said first data holding means a second transmission permission signal from said second timing control circuit.

8. The apparatus according to claim 1, wherein said synchronization control means comprises means for controlling synchronization of transfer of data in said operation executing means, means for holding the instruction detection signal supplied from said instruction detection means, and execution initiation delay means to responsive to said held instruction detection signal, the instruction detection signal output from said instruction detection means, and the output of said operation executing means for delaying initiation of execution of said feedback loop instruction by said operation executing means until said operation result holding means completes storage of the operation result from a preceding feedback loop process.

9. The apparatus according to claim 8, wherein said execution initiation delay means comprises means responsive to the instruction detection signal provided from said instruction detection means, a signal from said operation executing means indicating that initiation of a next instruction execution is ready, and said held instruction detection signal for delaying provision of an instruction to said operation executing means.

10. The apparatus according to claim 9, wherein said execution initiation delay means includes a plurality of gate circuits which are connected to provide synchronization control for said operation executing means and said operation result holding means.

11. The apparatus according to claim 5, wherein said timing means includes a gate circuit which generates said fifth hold timing signal to said operation result holding means.

* * * * *